United States Patent
Olwal et al.

(10) Patent No.: US 12,322,396 B2
(45) Date of Patent: Jun. 3, 2025

(54) CONTEXT-AIDED IDENTIFICATION

(71) Applicant: GOOGLE LLC, Mountain View, CA (US)

(72) Inventors: Alex Olwal, Santa Cruz, CA (US); Ruofei Du, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 247 days.

(21) Appl. No.: 18/050,329

(22) Filed: Oct. 27, 2022

(65) Prior Publication Data

US 2023/0136553 A1 May 4, 2023

Related U.S. Application Data

(60) Provisional application No. 63/263,473, filed on Nov. 3, 2021.

(51) Int. Cl.
*G10L 17/06* (2013.01)
*G06V 40/16* (2022.01)
*G06V 40/50* (2022.01)
*G06V 40/70* (2022.01)
*G10L 17/04* (2013.01)

(52) U.S. Cl.
CPC ............ *G10L 17/06* (2013.01); *G06V 40/172* (2022.01); *G06V 40/50* (2022.01); *G06V 40/70* (2022.01); *G10L 17/04* (2013.01)

(58) Field of Classification Search
USPC ....................................................... 704/1–504
See application file for complete search history.

(56) References Cited

U.S. PATENT DOCUMENTS

| 10,446,143 | B2 * | 10/2019 | Akbacak | G06F 40/166 |
| 10,555,106 | B1 * | 2/2020 | Mehra | G06F 3/165 |
| 10,867,301 | B2 * | 12/2020 | Withrow | G06Q 30/0185 |
| 11,107,368 | B1 * | 8/2021 | Rao | G06V 40/11 |
| 2012/0081363 | A1 * | 4/2012 | Kang | H04N 13/341 |
| | | | | 345/419 |

(Continued)

FOREIGN PATENT DOCUMENTS

WO WO-2023081605 A1 * 5/2023 ............ G06V 40/172

OTHER PUBLICATIONS

International Search Report and Written Opinion from PCT Apn. No. PCT/US2022/078893, Jan. 26, 2023, 15 pages.

(Continued)

*Primary Examiner* — Marcus T Riley
(74) *Attorney, Agent, or Firm* — Brake Hughes Bellermann LLP

(57) ABSTRACT

Smart devices can be configured to collect and share various forms of context data about where a user is located (e.g., location), what a user will be doing (e.g., schedule), and what a user is currently doing (e.g., activity). This context data may be combined with fingerprint data (e.g., biometrics) to help identify the fingerprint data. For example, a location of a user may help associated speech detected at that location with the user. These associations may be stored in a mapping database that can be updated over time to reduce ambiguities in identification. The mappings in the database may be used to train a machine learning model to recognize fingerprints as identities, which may be useful in applications, such as speaker identification.

23 Claims, 8 Drawing Sheets

(56) References Cited

U.S. PATENT DOCUMENTS

| | | | | |
|---|---|---|---|---|
| 2014/0164111 A1* | 6/2014 | Rodriguez | .......... | G06Q 30/0255 |
| | | | | 705/14.53 |
| 2015/0310444 A1* | 10/2015 | Chen | .................... | G06Q 20/308 |
| | | | | 705/44 |
| 2017/0103440 A1* | 4/2017 | Xing | ..................... | H04W 12/06 |
| 2017/0115742 A1* | 4/2017 | Xing | ..................... | G06F 3/0485 |
| 2017/0300905 A1* | 10/2017 | Withrow | ................ | G06V 20/80 |
| 2018/0031846 A1* | 2/2018 | Zhang | ................... | G06F 1/3231 |
| 2018/0293221 A1* | 10/2018 | Finkelstein | ............ | G06N 20/00 |
| 2021/0004597 A1* | 1/2021 | Dascola | .................. | G06F 3/013 |
| 2021/0065405 A1* | 3/2021 | Bissex | ................. | G06F 18/217 |
| 2023/0136553 A1* | 5/2023 | Olwal | .................... | G10L 17/04 |
| | | | | 704/235 |
| 2024/0273793 A1* | 8/2024 | DeCharms | ............... | G09B 5/06 |

OTHER PUBLICATIONS

Lu, et al., "Scan: Learning Speaker Identity From Noisy Sensor Data", IPSN; http://dx.doi.org/10.1145/3055031.3055073, 2017, 12 pages.

Wang, et al., "Speaker Diarization With LSTM", 2018 IEEE International Conference on Acoustics, Speech and Signal Processing (ICASSP), arXiv:1710.10468v7, 2018, pp. 5239-5243.

Zhang, et al., "Fully Supervised Speaker Diarization", ICASSP 2019—2019 IEEE International Conference on Acoustics, Speech and Signal Processing (ICASSP); arXiv:1810.04719v7, 2019, pp. 6301-6305.

* cited by examiner

CONTEXT-AIDED IDENTIFICATION

CROSS-REFERENCE TO RELATED APPLICATION

This application claims the benefit of U.S. Patent Application No. 62/263,473, filed on Nov. 3, 2021, the disclosure of which is incorporated herein by reference in its entirety.

FIELD OF THE DISCLOSURE

The present disclosure relates to computing devices and more specifically to systems and methods for computer identification of entities (e.g., people).

BACKGROUND

Computing devices can be configured for facial recognition and/or voice recognition to identify individuals from a population. For example, machine learning models can be trained to recognize an individual based on the individual's face/voice. A machine learning model for recognizing individuals from a larger population requires more resources than a machine learning model for recognizing individuals from a smaller population. An amount of training data needed to uniquely identify individuals from a population increases as the population grows. Further, processing and power requirements for identification increase as the population grows. One reason for this increase is that similarities found in larger populations require more complicated models to unambiguously identify individuals. New systems and methods are needed to improve the accuracy of computer identification for larger populations while maintaining practical storage and complexity requirements.

SUMMARY

In some aspects, the techniques described herein relate to a method including: gathering, by smart eyewear, first sensor data from an environment of a user; identifying the first sensor data as a fingerprint; collecting context information from at least one device communicatively coupled to the smart eyewear; determining possible identities of the fingerprint from the context information; associating the fingerprint with the possible identities to generate a plurality of associations between the fingerprint and the possible identities; updating a database with the plurality of associations between the fingerprint and the possible identities; gathering second sensor data from an environment of a user; identifying the second sensor data as the fingerprint; querying the database with the fingerprint; and if the database has an association from the plurality of associations between the fingerprint and a particular identity of the possible identities with a confidence level that satisfies a threshold criterion, then: identifying the fingerprint as the particular identity.

In some aspects, the techniques described herein relate to augmented reality glasses, including: at least one sensor configured to gather first sensor data at a first time and second sensor data at a second time, the second time after the first time; a communication module configured to receive context information from other devices in communication with the augmented reality glasses, the context information corresponding to the first time that the first sensor data was gathered; a memory storing a database; and a processor communicatively coupled to the at least one sensor and the communication module that is configured by software instructions to: receive the first sensor data; identify the first sensor data as a fingerprint; receive the context information; determine possible identities of the fingerprint from the context information; associate the fingerprint with the possible identities to generate a plurality of associations between the fingerprint and the possible identities; updating a database with the plurality of associations between the fingerprint and the possible identities; receive the second sensor data; identify the second sensor data as the fingerprint; and querying the database with the fingerprint to identify the fingerprint as from a particular identity when the database has an association of the fingerprint with the particular identity at a confidence level above a threshold.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
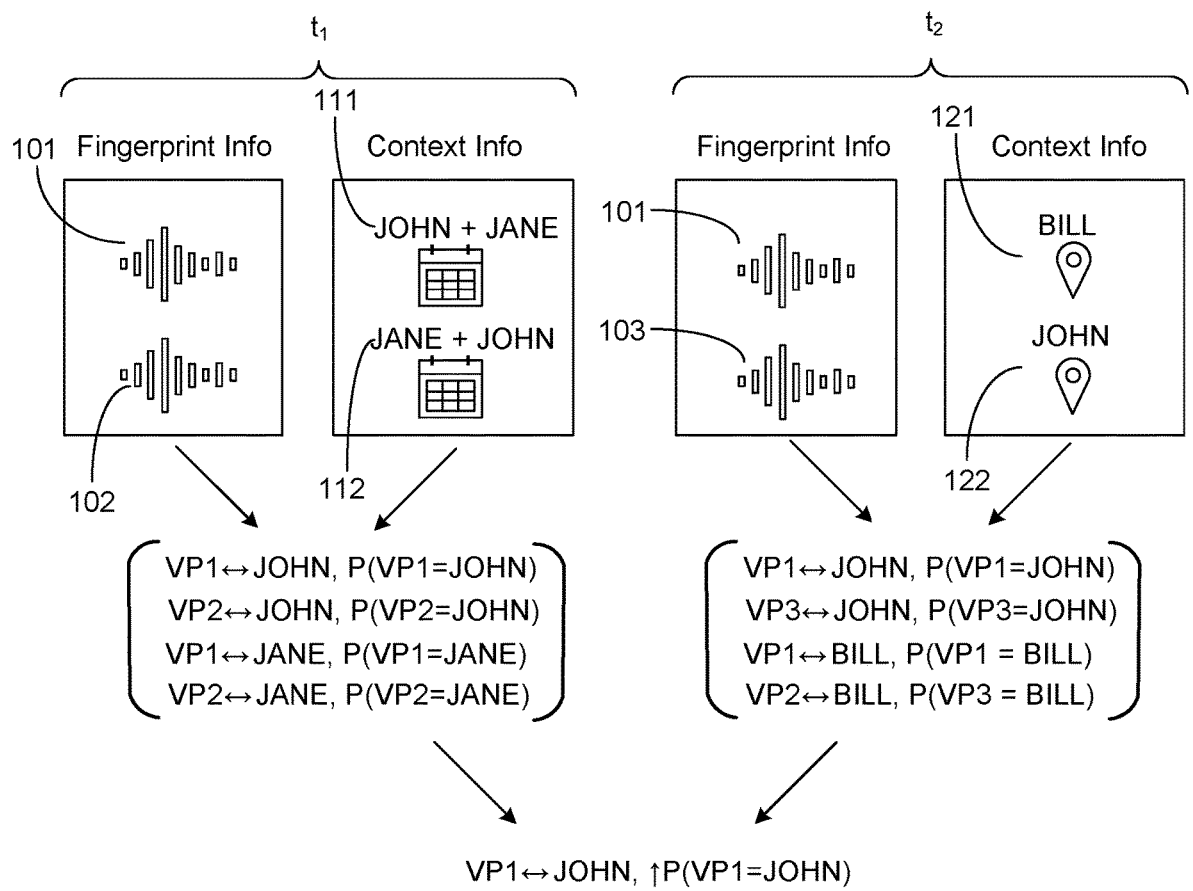
FIG. 1 illustrates a possible identification scenario according to an implementation of the present disclosure.

Using one machine learning model (i.e., a global model) for the computer identification of individuals from a population may have a variety of technical problems. When the population is larger, this global model approach is computationally burdensome and may require a network (i.e., cloud) for hosting and training due to its size and complexity. Global models that are cloud hosted/trained may require a remote connection that can create latency issues and can require recognition devices to have internet connectivity. Additionally, global models that are cloud hosted/trained can introduce privacy concerns.

To solve, at least, these technical problems, the disclosed approach uses multiple machine learning models (i.e., local models) for the computer identification of individuals from the population. The local model approach effectively divides a larger population into smaller populations. The local models for computer identification can each be hosted/trained for each smaller population to avoid the size and complexity problems described above. For example, the local model approach does not require recognition devices to have internet connectivity, thereby saving bandwidth, preserving privacy, and improving performance.

One technical problem facing the local model approach is accuracy. The accuracy of the identification using a local model may be reduced given the local model's smaller size and lower complexity. One possible reason for this is that it can be difficult to determine who is in a local population. The disclosed approach solves this technical problem by utilizing context derived from auxiliary data to improve the identification. The disclosed computer identification approach collects auxiliary data for individuals, such as location, schedule, and activity information to help cluster and select (i.e., filter, down-select) individuals-of-interest for identification (e.g., from the smaller population). Further, one recognition device may be configured to share this location, schedule, and activity information (i.e., auxiliary data) with another (co-located) recognition device to help identify an individual or individuals.

The disclosed approach may be able to more efficiently and more accurately identify humans, objects, or devices (i.e., entities, sources) than conventional approaches by combining (conventional) recognition information (i.e., fingerprint information) with location, schedule, and activity information (i.e., context information) collected or shared by a smart device.

Recognition information, which may also be referred to as biometrics, may be any uniquely identifying characteristic of an entity that can be used for automated recognition. Recognition information for a person for example, may be characteristics of the speaker's voice that are recognizable. These voice characteristics (i.e., voice features) may be extracted from speech of a user and used to form a voice fingerprint (i.e., voiceprint voice biometric, voice recognition information). Subsequently detected speech may be processed to extract features that can be compared to features of the voice fingerprint to identify the speech as being from the speaker. When the speaker's identity is known and associated with the voice fingerprint then identifying the speaker by the voice fingerprint is possible.

Context information may be any identifying information from a computing device that can be correlated with a particular user at a particular time. Context information may help to associate a voice fingerprint, gathered at a particular time, with an identity in order to make an identification of the voice fingerprint possible. Combining recognition information with context information may have the technical effect of improving the identification of entities in an environment for applications in augmented reality (AR).

AR applications running (e.g., executing) on AR glasses could greatly benefit from recognizing individuals in the environment. For example, tagging speech-to-text transcripts of dialogues between speakers may be helpful to hard of hearing (e.g., deaf) users and/or users in a crowded environment. The limited resources (e.g., processing, battery) of the AR glasses can make conventional (e.g., global model) voice recognition required for this tagging challenging, especially considering the real-time aspect of speech-to-text transcription. The disclosed approach can enable the AR glasses to recognize (e.g., to learn to recognize) an individual by his/her voice, by building a database associating (i.e., mapping, grouping) (i) at least one identifying feature (i.e., biometric, fingerprint) of the individual that is sensed using sensors on the AR glasses with (ii) at least one piece of context identifying the individual that is collected from devices in communication with the AR glasses. An association can be linked data in a database. For example, the database may map (i.e., associate) a voice fingerprint to a name with a confidence level that indicates a strength of the association. For example, a database may include an entry that includes a voiceprint, an entity identifier (e.g., a name), and a confidence level. The confidence level may be a probability between zero (i.e., 0%) and 1 (i.e., 100%) that the voiceprint is, in fact, from the entity. Initially the confidence level may be low but can grow as the number of interactions with the individual increases. For example, the confidence level of a current association can be increased when the context information supports (i.e., confirms, validates) a previous association. Alternatively, the confidence level can be decreased when the context information does not support (i.e., contradicts, undermines, invalidates) a previous association. When a confidence level of an association reaches a predetermined level (i.e., threshold), then the association may be concluded. For example, when a probability for voiceprint/name pairing is greater than or equal to a threshold then the pair may be concluded as valid by making its probability equal to 1 (i.e., 100%). After this conclusion is reached, recognition of the individual based on the voice fingerprint may proceed very quickly and with limited computing and power requirements. For example, the voiceprint/name pairing may not need further adjustment in the database and recognition of subsequent voiceprints matching the stored voiceprint may be easier. This approach balances the resource limitations of the AR glasses with the need for accurate identification by making the associations over time and only making associations for individuals common to the user's environment (e.g., within a social graph of the user, associated with an account of a user, in communication with a user). Accordingly, the mapping databases for different AR glasses (i.e., for different users) may be different and may change with time.

The mapping database (i.e., database) stores observations that are mappings between recognition information (including probabilities) and context information (including probabilities). The mappings can be used to iteratively train (and retrain) a machine learning model, such as a neural network or a support vector machine (SVM). When trained, the machine learning model represents these relationships so that when it is queried (e.g., using recognition information) it can return an identification. In a possible implementation, the identification includes a probability (i.e., confidence) corresponding to the identification so that a higher probability indicates a more certain identification. A system (e.g., AR glasses) can thus use groups of mappings to solve for unique mappings between an identification (e.g., a name) and a fingerprint (e.g., voice print).

For the purposes of discussion, biometrics of an entity (e.g., voiceprint, facial features, gate features) may be referred to herein as "fingerprints" of the entity because they can be used to identify the individual like a physical fingerprint. It should be understood that "fingerprints" as used herein are generated from sensors, such as cameras and microphones focused on an entity and are not collected impressions of fingers. In other words, in what follows, a fingerprint may be synonymous with recognition information or biometrics. The following may describe a fingerprint, either alone or in combination. A fingerprint can be a one or more aspects of a voice. A fingerprint can be one or more features of a face, a fingerprint can be one or more features of a gait.

FIG. 1 illustrates a possible identification scenario according to an implementation of the present disclosure. At a first time (t1), audio data is collected and analyzed to generate recognition information (i.e., fingerprint information) including a first voice fingerprint (i.e., first voiceprint 101) (i.e., VP1) and a second voiceprint 102 (i.e., VP2). From this recognition information alone, it may not be possible to determine an identity (ID) of one or both of the speakers with a confidence (i.e., probability) sufficient to reach a conclusion. Accordingly, at the first time (t1), auxiliary data (i.e., context information) is collected and analyzed to determine possible identities of the voiceprints. The context information at the first time (t1) includes a first schedule entry 111 and a second schedule entry 112. The context information may be analyzed to determine that at the first time (t1), the first schedule entry and the second schedule entry match and are for a meeting between a first candidate source of the voiceprint (i.e., JOHN) and a second candidate source of the voiceprint (i.e., JANE). Accordingly, the voiceprints VP1 and VP2 can be concluded to be from JOHN and JANE but the precise mapping may be ambiguous. This ambiguity can be solved by collecting data over time. For example, at the first time (t1) the system may conclude that the first voiceprint (VP1) is equally likely to be JOHN or JANE (i.e., P (VP1=JOHN)=P (VP1=JANE). Accordingly, the system can assign a probability (i.e., confidence) to the mapping (i.e., association) between VP1 and JOHN of 50% (i.e., P (VP1=JOHN)=0.5) and a probability to the mapping between VP1 and JANE of 50% (i.e., P (VP1=JANE)=0.5).

At a second time (t2), audio data is collected and analyzed to generate recognition information including the first voiceprint 101 (i.e., VP1) and a third voiceprint 103 (i.e., VP3). Additionally, at the second time (t2), auxiliary data is collected and analyzed to generate context information. The context information at the second time (t2) includes a first location 121 and a second location 122. The context information may be analyzed to determine that at the second time (t2), the first location and the second location match and are for a third candidate source (i.e., BILL) and a first candidate source (i.e., JOHN). Accordingly, the voiceprints VP1 and VP3 can be concluded to be from BILL and JOHN but the precise mapping may be ambiguous. This ambiguity can be solved by considering the conclusions made at the first time (t1) and the second time (t2). In particular, at the second time the first voiceprint (VP1) can be mapped to JOHN with a higher confidence (i.e., P (VP1=JOHN)>0.5). Likewise, this information may help map the second voiceprint (VP2) to JANE and the third voiceprint (VP3) to BILL. The conclusion made using the recognition information and the context information can help to generate and update mappings in a database that maps (i.e., pairs, groups, connects) voiceprints to people. For example, when the confidence of the association between the first voiceprint and JOHN meets or exceeds a threshold probability, then the system may conclude that the first voiceprint is JOHN, and only JOHN (i.e., P (VP1=JOHN)=1).

In general, the disclosed approach describes a system that builds and updates a database linking (i.e., mapping) identities to recognition information (i.e., fingerprints) over time. The mappings connect groups of identified (i.e., fingerprinted) identities (i.e., IDs) to groups of sources (e.g., people, devices, objects) based on their matching context.

Figure 2:
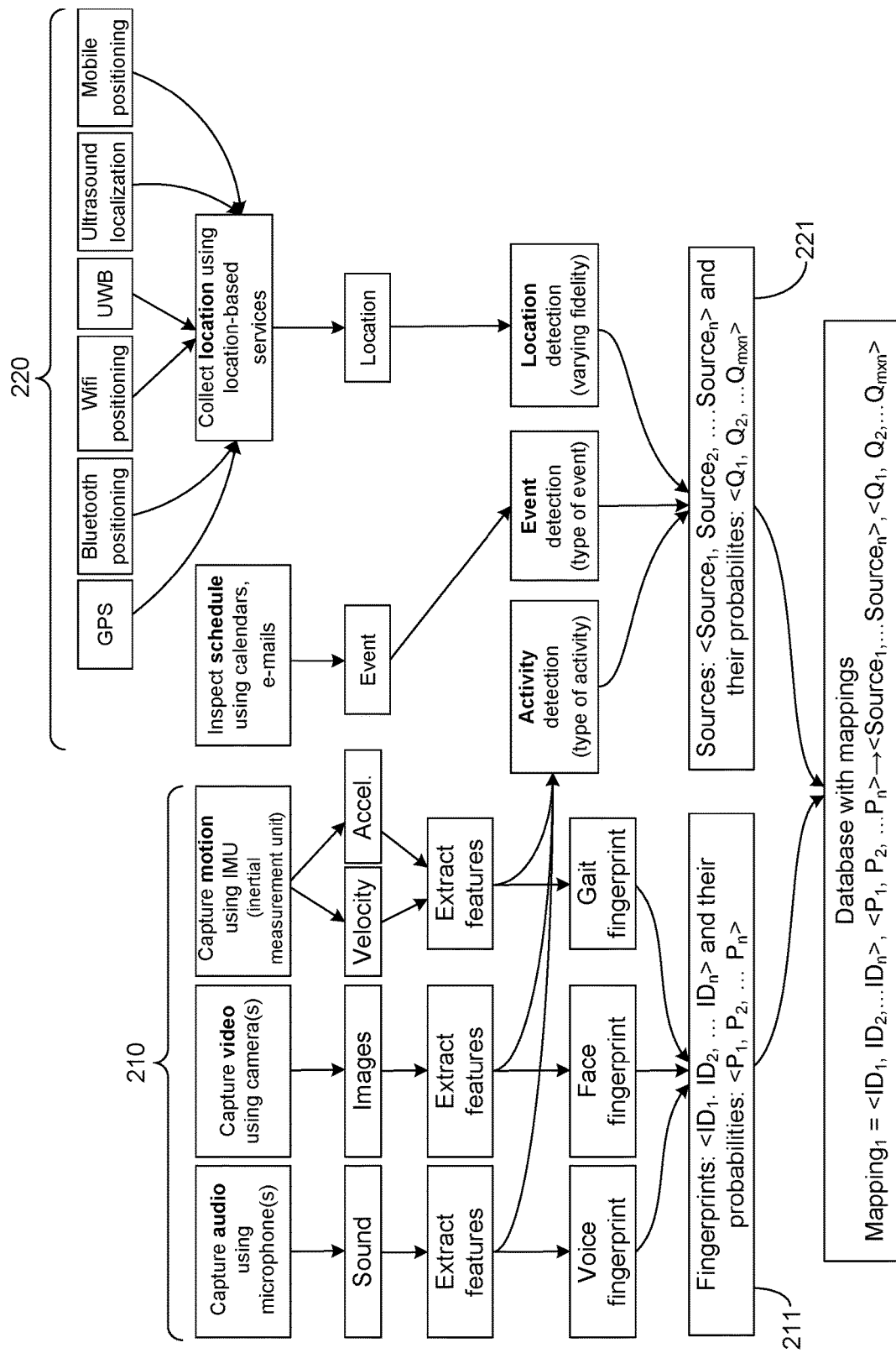
FIG. 2 illustrates a process to generate a database of mappings connecting fingerprinted identities to possible sources according to an implementation of the present disclosure.

FIG. 2 illustrates a process 200 to generate the database with mappings (i.e., mapping database 201) according to a possible implementation of the present disclosure. The process includes gathering fingerprints 210 for entities (e.g., users, devices, identities, etc.) from sensor data. A fingerprint may include characterizing information that distinguishes one entity from another entity. For example, a first user may be identified based on a first fingerprint and a second user may be identified based on a second fingerprint. The first fingerprint and/or the second fingerprint may not identify each user by name but may be sufficient to distinguish the two users. A fingerprint may include one or more feature fingerprints that characterize a particular aspect of a user. For example, a fingerprint for a user may include a voice fingerprint (i.e., voiceprint) for the user, a face fingerprint (i.e., face) for the user, and a gait fingerprint (i.e., stride) for the user. Each feature fingerprint can be determined (i.e., generated) from sensor data captured by a sensor.

Microphone(s) (e.g., on smart eyewear) can capture audio data (i.e., audio) that can be processed to generate voice fingerprints (i.e., voiceprint). For example, sound features may be extracted from a voice in the audio and used to form a voice fingerprint. The sound features may be for sounds other than voices. For example, entities, such as a device (e.g., ringtone), a car (e.g., engine noise), or an animal (e.g., dog), may each produce sounds that can be processed to extract sound features used to form voice fingerprints for the entities.

Camera(s) (e.g., on smart doorbells, on smart eyewear) can capture image data (i.e., video, image) that can be processed to generate face fingerprints (i.e., familiar faces). For example, face features may be extracted from a face located in an image and used to form a face fingerprint.

Movement sensor(s) (e.g., inertial measurement units (IMU)) on devices held by, or worn on, users (e.g., smart eyewear, mobile phone) can capture movement data (e.g., velocity, acceleration) that can be processed to generate gate fingerprints. For example, movement features may be extracted from a velocity and/or acceleration of a user to form a gait fingerprint that characterizes how an individual moves (e.g., walks).

The feature fingerprints for an individual can be collected (e.g., combined) to form a fingerprint for the individual. The fingerprint may identify the individual, or at least, distinguish the individual from other individuals. The fingerprint for the individual may be associated with a confidence level (i.e., probability). The confidence may be expressed as a probability that the fingerprint identifies the individual. For example, a fingerprint with a high probability (e.g., P>0.5) may be more likely to distinguish the individual than a fingerprint with a low probability (e.g., P<0.5). Gathering fingerprints 210 (i.e., recognition information) may be performed repeatedly (e.g., overtime) to build/update a fingerprint database 211 for a plurality of identities (ID1, ID2, . . . . IDn) each having a corresponding confidence that can be represented by a probability (P1, P2, . . . . Pn). For example, the fingerprint database 211 may include entries that each include a fingerprint, an identity, and a probability that the fingerprint is the fingerprint of the identity.

Identifying a user based on a fingerprint alone may be ambiguous in some environments and situations. For example, voice recognition may use audio analysis (e.g., D-vector analysis) to generate a unique voice fingerprint (i.e., voiceprint) of a user. The voiceprint is approximate and may lead to a false-identification or no-identification based on this approximation. Further, while the voiceprint may be recognized, it does not provide an identity unless it is linked with a user. Matching the recognized voiceprint with information that describes its context may help to link the voiceprint with the user. Accordingly, the process 200 further includes identifying candidate sources (e.g., people, devices, objects) based on context data 220.

Context data 220 may be collected by a device (or devices) associated (e.g., worn, held, used) with a user. The devices may include one or more of a mobile phone, a smartwatch, smart eyewear, a fitness tracker, and a smart ring. The context data collected by these devices can be broadcast or shared to help identify candidate sources based on an activity, event, and/or location of the candidate source (i.e., source). The context data may be shared by devices in a variety of ways.

Context data 220, such as network identifiers, may be broadcast. Devices in a network may broadcast a network identifier as part of a network communication protocol. For example, a Bluetooth enabled device may broadcast a device ID that can be used to locate a user. Device IDs received in the same area can indicate users that are co-located.

Context data 220 may be implicitly shared. Various opt-in mechanisms, such as scheduling a meeting, may trigger a device to share context data with one or more other devices. For example, sharing a calendar or accepting a meeting invitation may implicitly provide location/time information that can be used to locate a user.

Context data 220 may be explicitly shared. A device may be configured to share its location. For example, a user may configure his/her device for location tracking to provide this location information to (selected) other devices (i.e., other users).

Context data 220 may be combined to help identify a source of a detected fingerprint. For example, location information about a user combined with schedule information may help to determine that a particular user was the source of a detected fingerprint.

Context data 220 may include a detected activity of a source. For example, sound, images, and or movement of a user may be processed to detect an activity or type of activity. For example, context data showing a source as seated may separate that source from other sources that are moving. This may be helpful in linking two sources as collocated. For example, two users may be seated together in conversation while other users move around them. This seated activity can be detected based on any combination of audio features, video features, and motion features.

Context data 220 may include a detect event of a source. For example, schedules for sources may be shared through calendars and/or emails. Events may be detected in the schedules. These events may be used to locate one or more sources in time and space. For example, two sources have a meeting scheduled for a particular time and place.

Context data 220 may include a location collected for a source. A location of a user may be determined or inferred based on location data using one of a variety of localization services. For example, location data may be collected using global position (GPS), mobile positioning, Wi-Fi localization, Bluetooth localization, ultra-wideband (UWB) localization, ultrasound localization, and the like. In these examples, the location data may be collected by a device used (e.g., held/worn) by a user. Location data may also be collected using one or more devices not used by a user. For example, a user recognized in images from cameras installed at a location (e.g., CCTV cameras, doorbell cameras, etc.) may indicate that the user is at the location. In another example, locations may be inferred from images captured in a camera used by the user. Characterizing features (e.g., signs, landmarks, etc.) recognized in images from a camera directed to a user's field of view may be used (e.g., with other localization data) to infer a location of a user.

Identifying candidate sources based on context data 220 may be performed repeatedly (e.g., overtime) to build/update a source database 221 for a plurality of sources (SOURCE1, SOURCE2, . . . . SOURCEn) each having a corresponding confidence that can be represented by a probability (Q1, Q2, . . . . Qn). For example, the source database 221 may include entries that each include a source, a source identity, and a probability that the source is the source of the source identity.

The system builds up a mapping database 201 over time that connects (i.e., maps) groups of fingerprinted IDs to groups of sources (e.g., people, devices, objects) based on matching contexts. The system can thereafter use groups of mappings to solve for a unique mapping between an identity and a user (i.e., person). Without using probabilities, these groups of mappings can be expressed as systems of linear equations and solved using established techniques. If there is a single individual, then the ID can be mapped to them directly. For a group, the technique would allow disambiguation over time, as the intersection of various sets of users would allow the system to deduce which individual should be mapped to a specific ID.

The disclosed identification techniques could be applied to smart-home cameras to help recognize and respond to familiar faces. The disclosed identification techniques could also be applied to smart speakers to help recognize and respond (e.g., personalized commands, personalized information) to familiar speakers. The disclosed identification techniques could also be applied to AR glasses and AR telepresence systems to separate multiple speakers (i.e., speaker separation). Because the mapping database can be local to the device performing the recognition, it is configured to recognize certain possible users. As a result, this mapping database can be smaller than a database configured to recognize all possible users.

In one possible implementation, the identification of speakers in an environment can be used by a pair of AR glasses to partition an audio stream into segments identified by speaker (i.e., speaker diarization). The partitioned audio stream can be used to generate a speech-to-text transcript, having identified speakers (i.e., diarized transcript). The diarized transcript may be displayed in a heads-up display of the AR glasses to help a user better understand a conversation as it occurs. In a possible use case, a deaf user, a hard-of-hearing user, or a user in a noisy environment (i.e., a non-hearing user) can rely on the transcript with each utterance tagged according to the speaker who spoke the utterance (i.e., the diarized transcript) to understand who is speaking.

Figure 3:
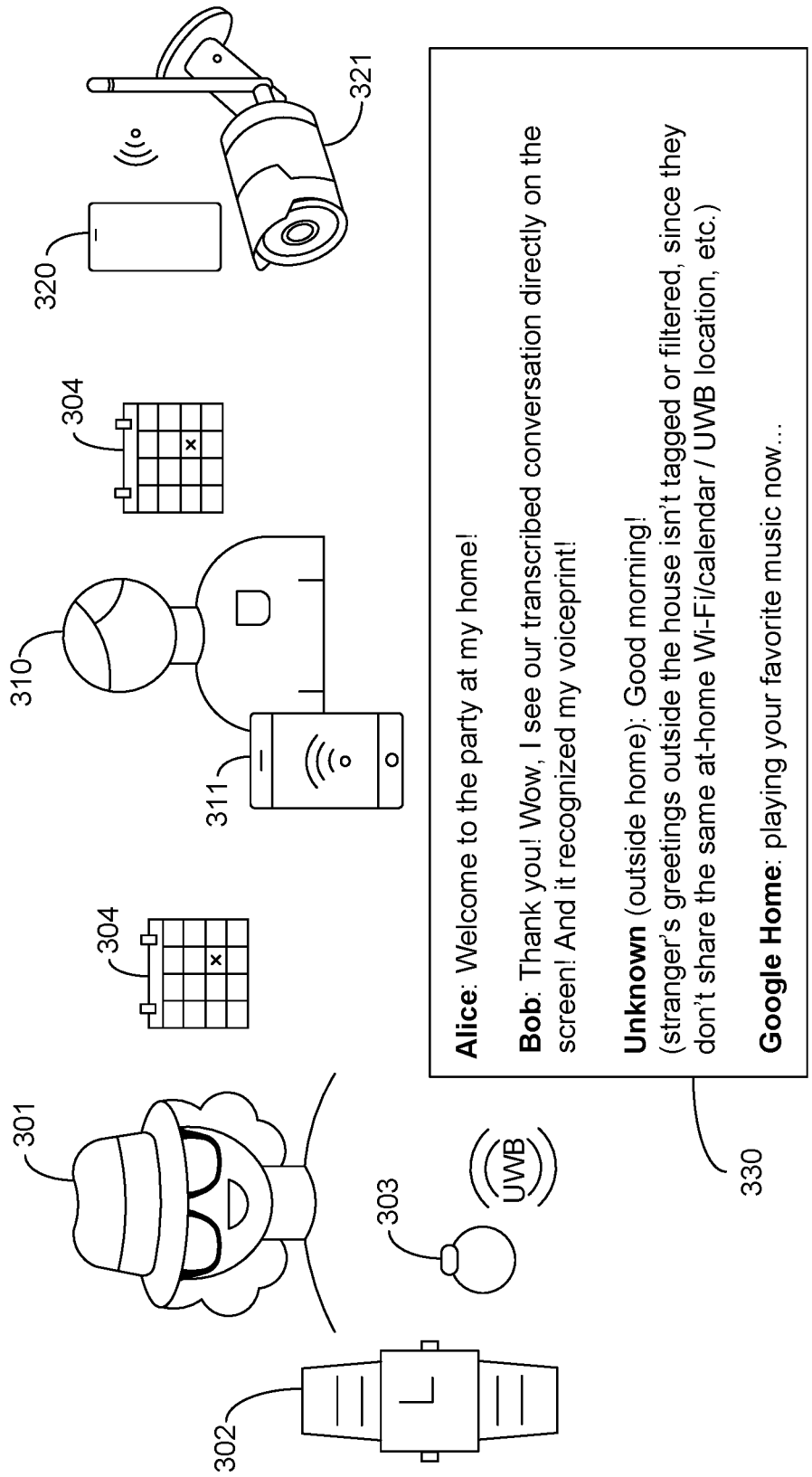
FIG. 3 illustrates an application of the context aided identification according to an implementation of the present disclosure.

FIG. 3 illustrates an application of context aided identification according to an implementation of the present disclosure. A transcript 330 with identified (i.e., tagged) speakers can be presented on AR glasses of a user (Bob). The transcript identifies four speakers. Some of the speakers are people identified by name, one of the speakers is unknown, and one of the speakers is a device identified by name. The identification may be made using context. The context may be collected from devices worn by a user. For example, the first user 301 (Alice) wears a smart watch 302 and a smart ring 303. The smart watch 302 and the smart ring 303 can be located (e.g., at the home of Alice) using an ultra-wideband (UWB) localization service. The location of the first user 301 can be compared to a location of a second user 310 based on a WiFi access of a mobile phone 311 used by the second user 310. Accordingly, the voice of the first user and the voice of the second user are colocated. A scheduled event 304 is shared that matches two particular users (Bob, Alice) at the same time the voiceprints are detected and in the same location as captured by the localization services. Accordingly, the two voiceprints may be compared to voiceprints for the two users in order to recognize an identity of the speakers.

FIG. 3 also shows that a voiceprint that is not recognized and that located outside the house can be filtered based on context. For example, the context shows that a device 320 of the source does not share the Wifi, calendar, and UWB location of the other users. Additionally, a camera 321 recognizes the source as outside the house. Accordingly, this portion of the transcript is untagged and may be (in a possible implementation) filtered. FIG. 3 also shows that a voiceprint may be recognized from a device. For example, a voiceprint from a smart speaker may be recognized.

Figure 4:
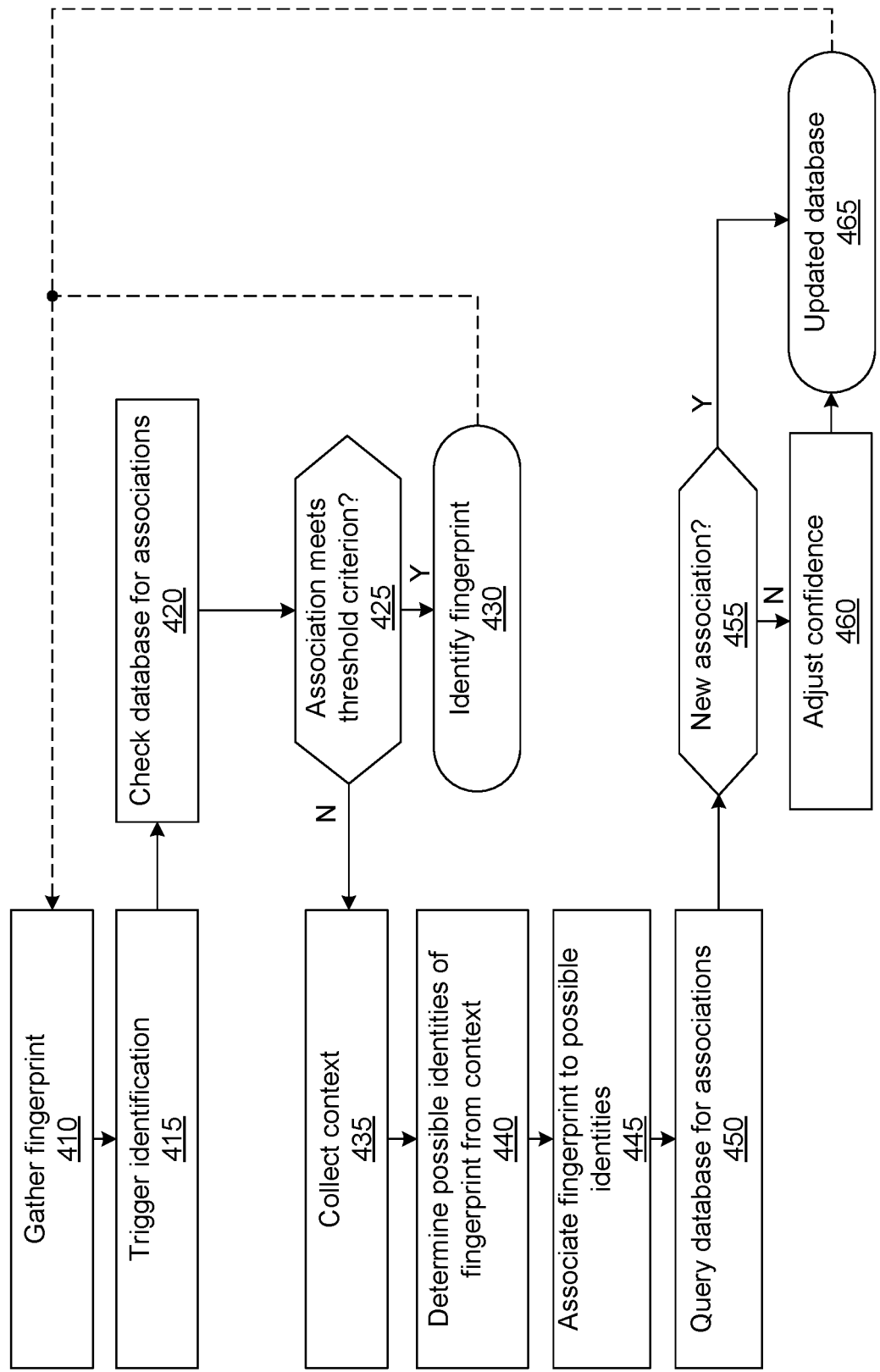
FIG. 4 is a flowchart of a method for associating fingerprints with individuals according to an implementation of the present disclosure.

FIG. 4 is a flowchart of a method for building a database of mappings between fingerprints and identities that can ultimately be used to identify a fingerprint. The method begins with gathering 410 a fingerprint. As mentioned, a fingerprint can be a biometric or other identifying feature unique to an entity. An example of a fingerprint is a voice fingerprint based on extracted features from sounds captured by a microphone. Another example of a fingerprint is a face fingerprint based on extracted features from images captured by a camera. As will be discussed a device of the user, such as augmented reality glasses, may be configured to capture these sounds and images and to extract their features to generate the fingerprints.

The method further includes triggering 415 an identification. The device used to gather the fingerprint may capture many sounds and images that are not identified (e.g., determined to not be important to the user) for identification. For example, a user wearing augmented reality glasses in a crowded environment may capture many images of faces that have no relation to a user and therefore are not worth the processing and storage required for identification. Accordingly, identification may be triggered for only fingerprints that have meaning to a user. This triggering may be accomplished in a variety of ways. In one possible implementation, a user can trigger identification through some input to AR glasses. In another possible implementation, an application running on AR glasses, such as a speech-to-text transcription running, may trigger identification. In another possible implementation some context, like a scheduled meeting, may trigger identification.

After identification is triggered, the method includes querying 420 a database for associations (i.e., mappings) corresponding to the gathered fingerprint. For example, a fingerprint gathered by a device configured for identification can be applied to the database to determine all of the stored associations. As mentioned previously, associations are stored in the database with corresponding confidence values. Accordingly, the method includes determining 425 if an association meets a threshold criterion (i.e., has a confidence above a threshold level). If the association meets the threshold criterion then the method includes identifying 430 the fingerprint based on the association. Alternatively, if the association does not meet the threshold criterion, then the method includes collecting 435 context information (i.e., context).

As mentioned, context information (i.e., context data) can be related to an activity, event, and/or location of individuals in the user's environment. In a possible implementation, this information is collected from the device of the user and/or from other devices in the user's environment. For example, a schedule in a shared calendar can be collected as context. The method includes analyzing the context data to determine 440 possible identities of the fingerprint. For example, the shared calendar may be analyzed to determine that at the time of the fingerprint collection, a meeting between the user and other users is scheduled. The identities of the other users provided in the meeting entry are all possible identities for the fingerprint. Accordingly, the method further includes associating 445 the fingerprint to possible identities.

The database includes associations formed from previous interactions. Accordingly, the method includes query 450 the database for associations including the possible identities obtained from the context. Each association may be compared with the database to determine 455 if the association is new (i.e., not already in the database). If the association is not in the database (i.e., a new association), then the database can be updated 465 by adding the new association between the fingerprint and the possible identity. An initial confidence assigned to this new association may be set at a fixed value or may be determined from the context information. For example, the probability (i.e., confidence) of a fingerprint association may be based on the number of possible identities of the fingerprint determined from the context information. If a previous association is found in the database, then the association is not new. In this case, the method includes adjusting 460 the confidence of the stored association based on this most recent association. For example, adjusting the confidence may include raising the confidence of an association when the context and history support the association or lowering the confidence of the association when the context and history do not support the association, and the database is updated to generate an updated database 465. The updated database 465 may be stored locally on a device (e.g., AR glasses) or on a network (e.g., cloud) in communication with the device. This method may be repeated over time so that the number of associations meeting the threshold criterion is increased. In other words, the database is updated over time to include conclusive associations between the fingerprints of the individuals most common in the user's environment. As a result, the identification of these individuals becomes a relatively easy task that is computationally, storage, and power efficient, which is especially useful when the process is implemented using smart eyewear (e.g., AR glasses).

The updated database 465 may be used to train (and retrain) a machine learning model. For example, the machine learning model may be iteratively trained over time as the database is updated. For example, the machine learning model may be retrained each time there is a new mapping of a fingerprint (i.e., recognition information) and a source (e.g., identity from context information). Alternatively, retraining may occur on a regular schedule. Alternatively, retraining may be triggered by a threshold associated with the mapping. For example, an adjusted confidence in the database can trigger retraining when the adjustment meets a threshold criterion.

Figure 5:
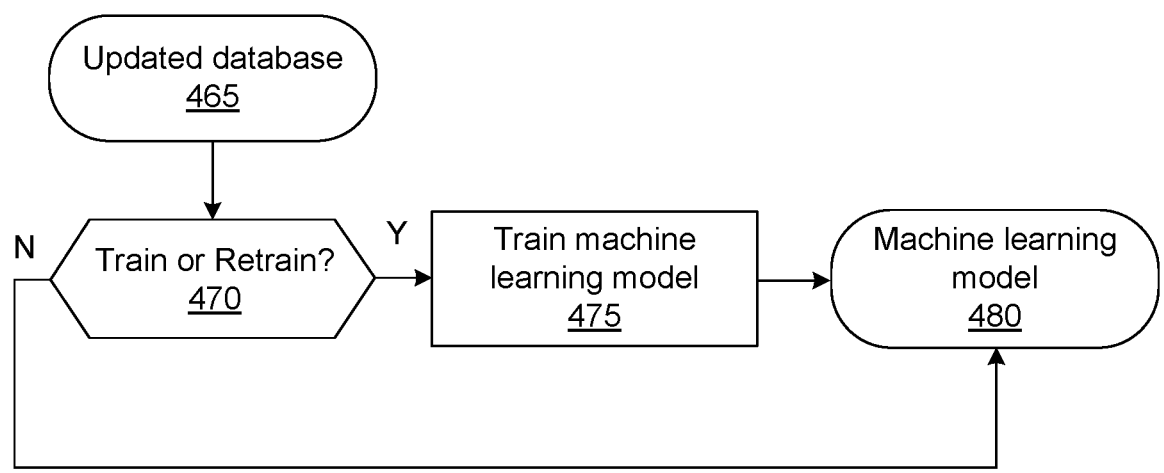
FIG. 5 is a flowchart of a method for training a machine learning model based on the updated database of FIG. 4 according to a possible implementation of the present disclosure.

FIG. 5 is a flowchart of a method for training a machine learning model 480 based on the updated database 465. The method includes determining if the updated database 465 needs training or retraining. If retraining is necessary 470, then the method includes training 475 a machine learning model. By training (or retraining), the machine learning model can effectively "learn" the mappings discovered and recorded in the updated database 465. As mentioned above, the machine learning model 480 may be iteratively retrained over time so that frequent mappings are reinforced (i.e., have a higher confidence). The machine learning model can be stored locally on a device for recognition (e.g., smart eyewear) or stored on a network accessible by the device for recognition.

Figure 6:
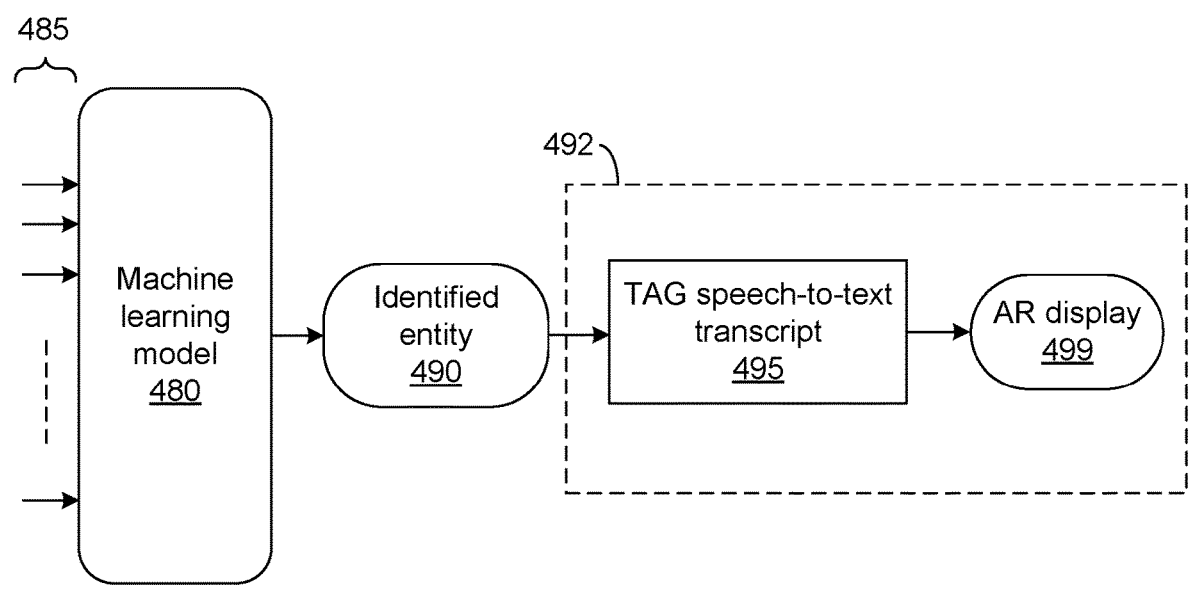
FIG. 6 is a flowchart of a method for using the machine learning model of FIG. 5 according to a possible implementation of the present disclosure.

FIG. 6 is a flowchart of a method for using the machine learning model according to a possible implementation of the present disclosure. As shown in FIG. 4, recognition information (e.g., fingerprints) may be identified 430. This method may be carried out using the method shown in FIG. 6. As shown, recognition information 485, such as corresponding to recorded audio/video, can be applied (i.e., input) to the (updated) machine learning model 480. Based on the recognition information 485, the machine learning model may return an identity of an entity (e.g., person, device, etc.). The identified entity 490 may be used by an application 492 to link the identity to the recorded audio/video. For example, the speech from an identified person may be tagged 495 in a speech-to-text transcript that is displayed to a user (e.g., on an AR display 499).

The disclosed techniques may be implemented on an AR device, such as AR glasses. For example, the sensors of the AR glasses may be configured to collect recognition information, a processor of the AR glasses may be configured to carry out method steps of the method described previously, and a memory of the AR glasses may be configured to store the database described previously.

Figure 7:
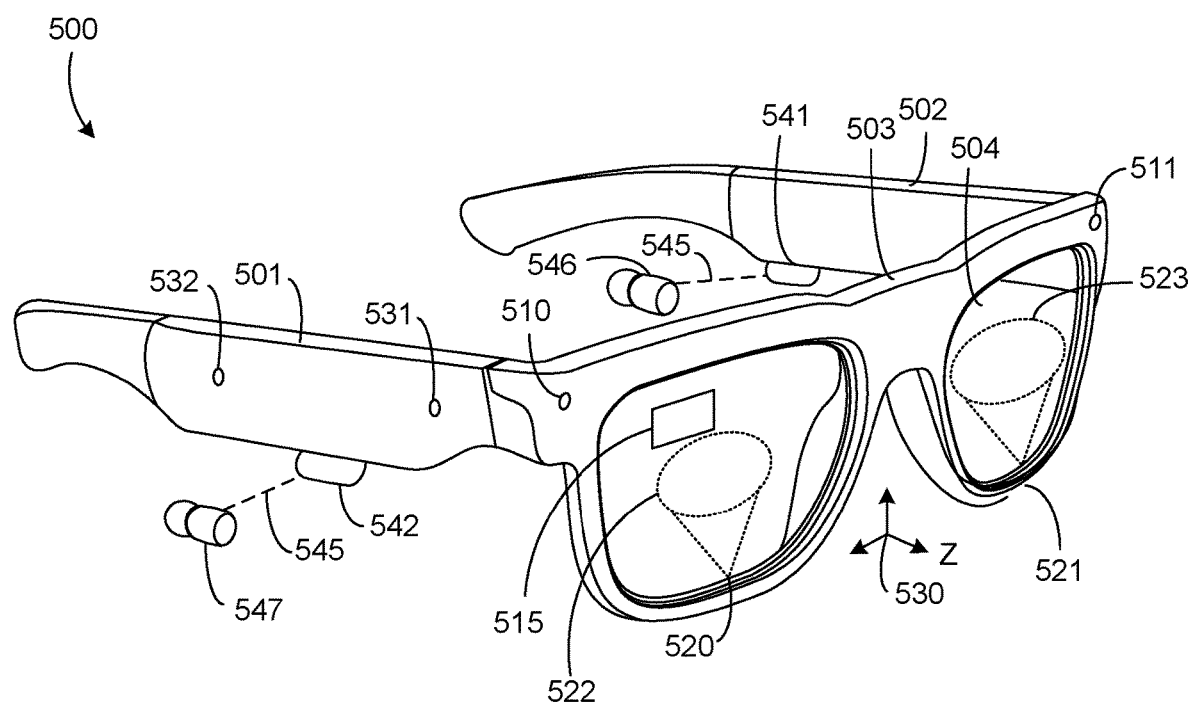
FIG. 7 is a perspective view of AR glasses for collecting sensor data corresponding to fingerprints according to a possible implementation of the present disclosure.

FIG. 7 is a perspective view of AR glasses according to a possible implementation of the present disclosure. The AR glasses 500 are configured to be worn on a head and a face of a user. The AR glasses 500 include a right earpiece 501 and a left earpiece 502 that are supported by the cars of a user. The AR glasses further include a bridge portion 503 that is supported by the nose of the user so that a left lens 504 and a right lens 505 can be positioned in front a left eye of the user and a right eye of the user respectively. The portions of the AR glasses can be collectively referred to as the frame of the AR glasses. The frame of the AR glasses can contain electronics to enable function. For example, the frame may include a battery, a processor, a memory (e.g., non-transitory computer readable medium), and electronics to support sensors (e.g., cameras, depth sensors, microphones, IMU, etc.), and interface devices (e.g., speakers, display, network adapter, etc.).

The AR glasses 500 can include a FOV camera 510 (e.g., RGB camera) that is directed to a camera field-of-view that overlaps with the natural field-of-view of the user's eyes when the glasses are worn. In a possible implementation, the AR glasses can further include a depth sensor 511 (e.g., LIDAR, structured light, time-of-flight, depth camera) that is directed to a depth-sensor field-of-view that overlaps with the natural field-of-view of the user's eyes when the glasses are worn. Data from the depth sensor 511 and/or the FOV camera 510 can be used to measure depths in a field-of-view (i.e., region of interest) of the user (i.e., wearer). In a possible implementation, the camera field-of-view and the depth-sensor field-of-view may be calibrated so that depths (i.e., ranges) of objects in images from the FOV camera 510 can be determined, where the depths are measured between the objects and the AR glasses.

The AR glasses 500 can further include a display 515. The display may present AR data (e.g., images, graphics, text, icons, etc.) on a portion of a lens (or lenses) of the AR glasses so that a user may view the AR data as the user looks through a lens of the AR glasses. In this way, the AR data can overlap with the user's view of the environment.

The AR glasses 500 can further include an eye-tracking sensor. The eye tracking sensor can include a right-eye camera 520 and a left-eye camera 521. The right-eye camera 520 and the left-eye camera 521 can be located in lens portions of the frame so that a right FOV 522 of the right-eye camera includes the right eye of the user and a left FOV 523 of the left-eye camera includes the left eye of the user when the AR glasses are worn.

The AR glasses 500 can further include a plurality of microphones (i.e., 2 or more microphones). The plurality of microphones can be spaced apart on the frames of the AR glasses. As shown in FIG. 7, the plurality of microphones can include a first microphone 531 and a second microphone 532. The plurality of microphones may be configured to operate together as a microphone array that has a beam of sensitivity directed in a particular direction.

The images (i.e., FOV, eye tracking) and the depth data collected by the AR glasses can be calibrated with (i.e., registered to) a coordinate system 530 (i.e., frame of reference), as shown in FIG. 7. The sensitivity (i.e., beam) of the microphone array can also be registered to the coordinate system 530 so that a gaze direction or a focus point may reference this coordinate system 530.

As shown in FIG. 7, the AR glasses may further include a left speaker 541 and a right speaker 542 configured to transmit audio (e.g., beamformed audio) to the user. Additionally, or alternatively, transmitting audio to a user may include transmitting the audio over a wireless communication link 545 to a listening device (e.g., hearing aid, earbud, etc.). For example, the AR glasses may transmit audio (e.g., beamformed audio) to a left wireless earbud 546 and to a right earbud 547.

Figure 8:
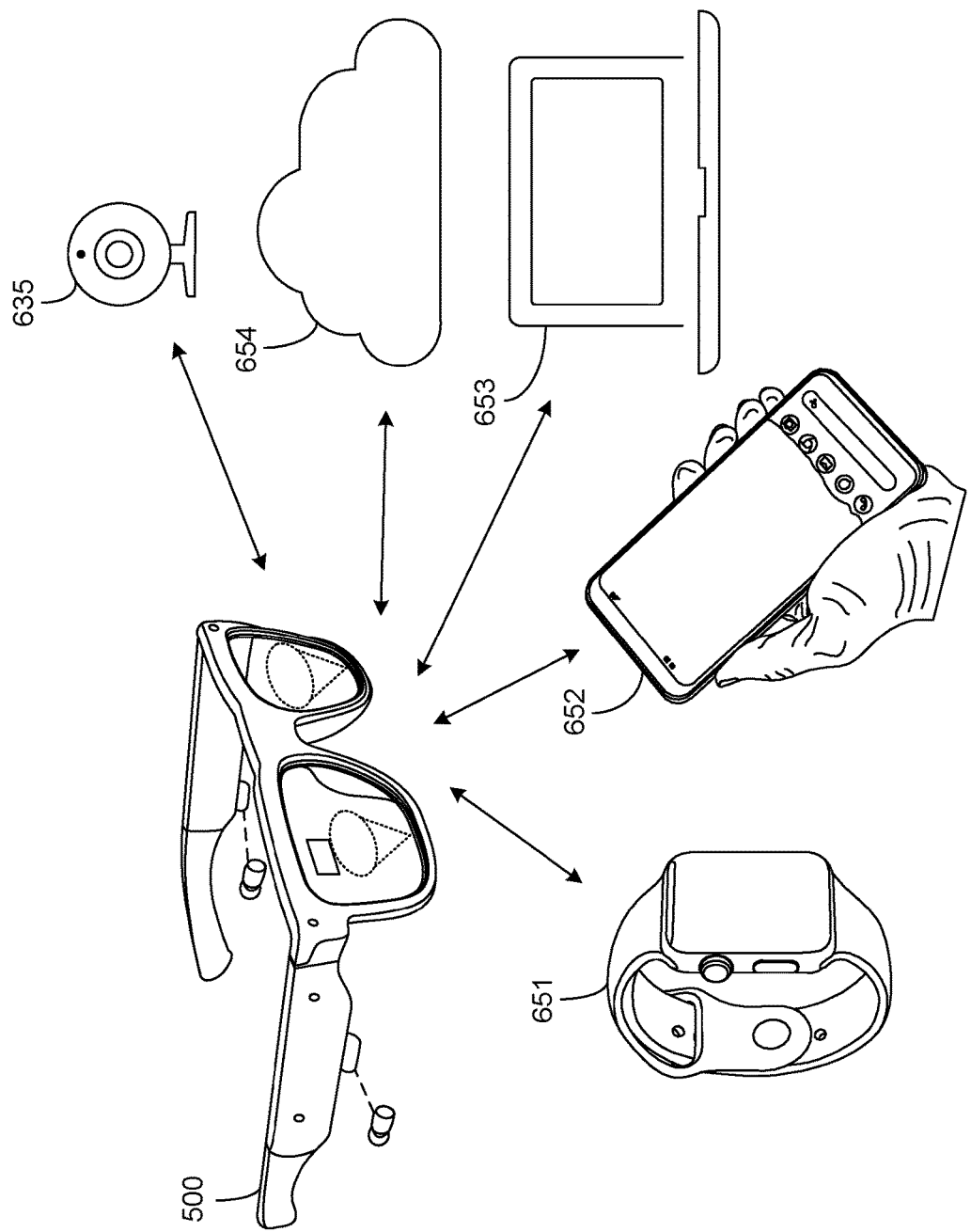
FIG. 8 illustrates a system for collecting context information according to a possible implementation of the present disclosure.

The AR glasses 500 may be configured (e.g., by a communication module) to communicate digitally with a variety of devices in the user's environment in order to collect context information. FIG. 8 illustrates a system for collecting context information according to a possible implementation of the present disclosure. The system includes the AR glasses 500 in communication with other devices. These other devices may include (but are not limited to) a smart watch 651, a mobile phone 652, a laptop computer 653, a cloud network 654, and a camera 655 (e.g., conference camera, webcam, CCTV, etc.). In a possible implementation the communication between the devices may help to determine relative locations of the devices. For example, the AR glasses and one or more of the other devices may perform localization using Bluetooth and/or ultra-wideband (UWB) communication. The localization may provide context information corresponding to colocation of the devices. For example, when two devices are within a threshold range they may be considered collocated. Collocated devices may help to determine a possible identity of a fingerprint. For example, an identity associated with a device that is in range of the AR glasses while a voice print is gathered may be used to help identify the source of the voice print.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A method comprising:
   receiving recognition information corresponding to an unknown identity;
   receiving context information, the context information correlated at a time with the recognition information;
   determining possible identities of the unknown identity based on the context information;
   querying a database with the recognition information; and
   when an association between the recognition information and one of the possible identities is identified in the database, then:
      adjusting a confidence level of the association based on the context information correlated at the time with the recognition information.

2. The method according to claim 1, wherein the recognition information includes a corresponding confidence, and the context information includes a corresponding confidence.

3. The method according to claim 2, further comprising:
   associating the recognition information with the possible identities to generate a plurality of associations between the recognition information and the possible identities; and
   training a machine learning model with the plurality of associations between the recognition information and the possible identities.

4. The method according to claim 3, wherein associating the recognition information with the possible identities includes:
   mapping the recognition information and its corresponding confidence with the context information and its corresponding confidence to generate mappings; and
   storing the mappings as database entries in the database.

5. The method according to claim 4, further comprising:
   updating the database based on the plurality of associations between the recognition information and the possible identities by:
      determining that the association between the recognition information and one of the possible identities is not identified in the database; and
      recording the association in the database with an initial confidence level.

6. The method according to claim 1, wherein adjusting the confidence level of the association includes increasing the confidence level when the context information supports the association.

7. The method according to claim 1, wherein adjusting the confidence level of the association includes decreasing the confidence level when the context information does not support the association.

8. The method according to claim 1, identifying the unknown identity as the one of the possible identities when the confidence level of the association is adjusted above a threshold.

9. The method according to claim 1, wherein the recognition information is a voice fingerprint based on audio captured by microphones of a smart eyewear.

10. The method according to claim 1, wherein the recognition information is a face fingerprint based on images captured by a camera of a smart eyewear.

11. The method according to claim 1, wherein the context information includes a calendar entry corresponding to the time that the recognition information was gathered.

12. The method according to claim 1, wherein the recognition information is gathered by a smart eyewear and the context information includes locations of devices near the smart eyewear at the time that the recognition information was gathered.

13. The method according to claim 1, wherein the database is stored locally on a smart eyewear.

14. The method according to claim 13, further comprising triggering, by an application running on the smart eyewear, identification of the recognition information.

15. The method according to claim 14, wherein the application is a speech-to-text transcript configured to tag a transcript by speaker based on identified voice fingerprints.

16. Augmented reality glasses, comprising:
   at least one sensor configured to gather first sensor data at a first time and second sensor data at a second time, the second time after the first time;
   a communication module configured to receive context information from other devices in communication with the augmented reality glasses, the context information corresponding to the first time that the first sensor data was gathered;
   a memory storing a database; and
   a processor communicatively coupled to the at least one sensor and the communication module that is configured by software instructions to:
      receive the first sensor data;
      identify the first sensor data as a fingerprint;
      receive the context information;

determine possible identities of the fingerprint from the context information;
associate the fingerprint with the possible identities to generate a plurality of associations between the fingerprint and the possible identities;
updating the database with the plurality of associations between the fingerprint and the possible identities;
receive the second sensor data;
identify the second sensor data as the fingerprint;
querying the database with the fingerprint;
identify a previously recorded association of the fingerprint with one of the possible identities in the database, the previously recorded association having a confidence level;
change the confidence level of the previously recorded association in the database based on the context information; and
identify the fingerprint from a particular identity when the confidence level is above a threshold.

17. The augmented reality glasses according to claim 16, wherein the context information includes identities corresponding to devices within a range of the augmented reality glasses.

18. The augmented reality glasses according to claim 16, wherein the fingerprint is a voice print corresponding to speech gathered by the at least one sensor.

19. The augmented reality glasses according to claim 18, wherein the processor is further configured to:
transcribe the speech to generate transcribed speech;
tag the transcribed speech with the particular identity in a transcript; and
display the transcript on a display of the augmented reality glasses.

20. The augmented reality glasses according to claim 16 wherein the processor is further configured to:
add an association of the fingerprint with the particular identity when the database does not include the association of the fingerprint with the particular identity.

21. The augmented reality glasses according to claim 16, wherein:
the confidence level is increased when the context information supports the previously recorded association; or
the confidence level is decreased when the context information does not support the previously recorded association.

22. Augmented reality glasses comprising:
at least one sensor configured to capture biometric information corresponding to an unknown identity;
a communication module configured to receive context information, the context information correlated at a time with the biometric information;
a memory storing a database; and
a processor configured by software instructions to:
determine possible identities of the unknown identity based on the context information;
query the database with the biometric information;
identify a previously recorded association between the biometric information and a particular identity of the possible identities in the database, the previously recorded association having a confidence level; and
increase the confidence level of the previously recorded association in the database based on the context information correlated at the time with the biometric information.

23. The augmented reality glasses according to claim 22, wherein the processor is further configured to:
identify the biometric information as being from the particular identity when the confidence level is increased above a threshold.

* * * * *